R. MANCHA.
STORAGE BATTERY LOCOMOTIVE.
APPLICATION FILED AUG. 31, 1918.
1,291,581.
Patented Jan. 14, 1919.
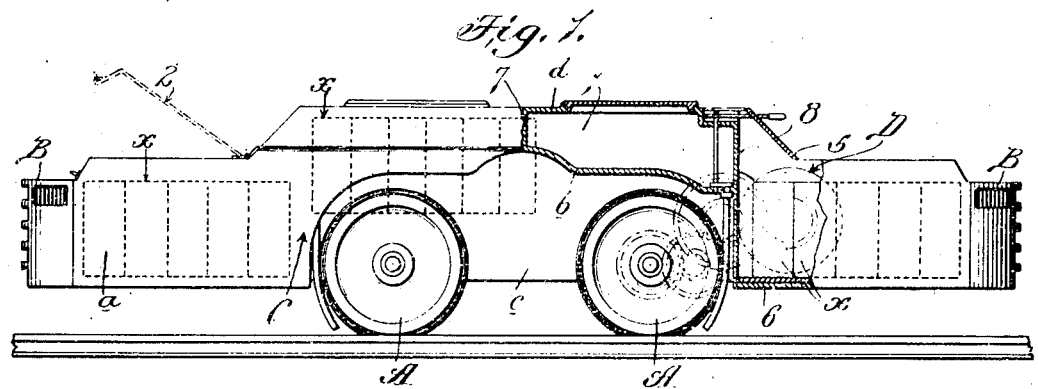
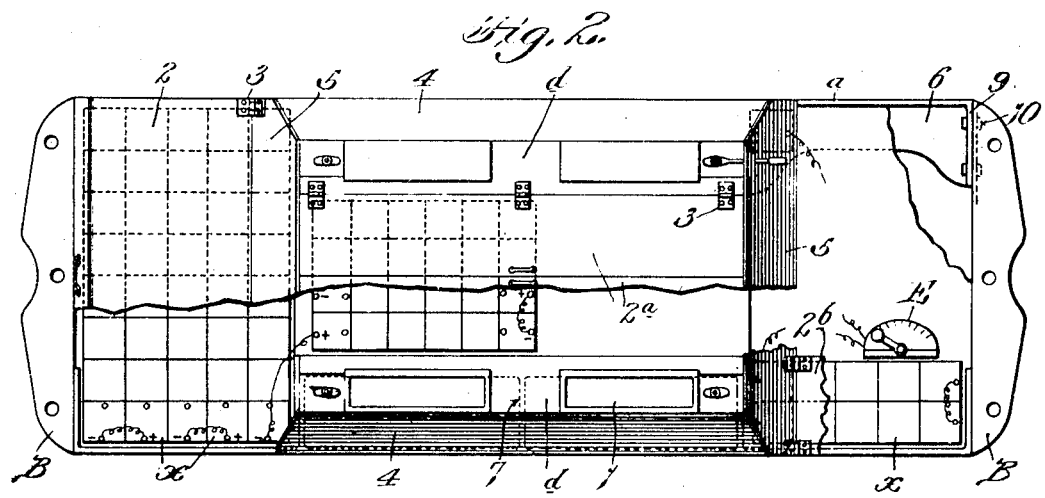
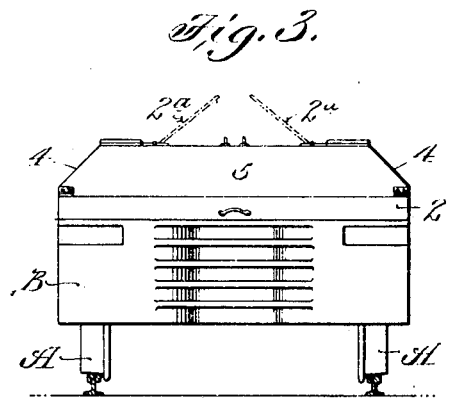
Inventor
Raymond Mancha.
By Bakewell Cornwall Attys.

UNITED STATES PATENT OFFICE.

RAYMOND MANCHA, OF ST. LOUIS, MISSOURI, ASSIGNOR TO MANCHA STORAGE BATTERY LOCOMOTIVE COMPANY, OF ST. LOUIS, MISSOURI, A CORPORATION OF DELAWARE.

STORAGE-BATTERY LOCOMOTIVE.

1,291,581.   Specification of Letters Patent.   Patented Jan. 14, 1919.

Application filed August 31, 1918. Serial No. 252,216.

*To all whom it may concern:*

Be it known that I, RAYMOND MANCHA, a citizen of the United States, residing at St. Louis, Missouri, have invented a certain new and useful Improvement in Storage-Battery Locomotives, of which the following is a full, clear, and exact description, such as will enable others skilled in the art to which it appertains to make and use the same.

This invention relates to storage battery locomotives of the general type described in my prior U. S. Patent No. 1,224,122, dated April 24, 1917.

The main object of my present invention is to provide a storage battery locomotive that can be successfully used in coal mines for hauling coal cars through tunnels or seams that are exceedingly low,—for example, thirty inches in height.

Another object is to provide a storage battery locomotive of the character above mentioned that has sufficient motor and battery capacity to enable it to be used for a full working day without recharging it, for hauling loads up to 100 tons.

And still another object is to provide a practicable storage battery locomotive that has the desirable characteristics above mentioned and which is so constructed that all of the batteries are accessible but are completely protected from injury when the locomotive is in use.

Figure 1 of the drawings is a side elevational view, partly in vertical section, of a storage battery locomotive constructed in accordance with my invention.

Fig. 2 is a top plan view, partly broken away, of the locomotive shown in Fig. 1; and Fig. 3 is an end elevational view of said locomotive.

My improved storage battery locomotive consists of a relatively low frame of rectangular shape in outline supported on wheels A and provided with an intermediate compartment and two end compartments in which storage batteries $x$ are arranged. Said frame is preferably composed of two end sills B and two side members C connected together by bolts, rivets or in any other suitable manner, so as to enable the same side members to be used with end sills of different length, thus reducing the cost of manufacturing the locomotive when it is constructed in various widths to suit tracks of different gages. The side members C are provided with integral sand boxes 1 that are located over the wheels A, as shown in Fig. 1, instead of between the wheels and end sills of the locomotive frame, as in the storage battery locomotive described in my prior patent previously referred to. By constructing the side members of the frame in this manner I obtain two compartments the full width of the frame at each end of the locomotive, one of said compartments being used to house some of the storage batteries and the other being used to house some of the storage batteries and also to serve as a cock pit for the operator in charge of the locomotive. The intermediate portions of the side members C are a trifle deeper or higher than the end portions of said members, due, of course, to the fact that said intermediate portions contain the sand boxes 1, but this extra depth is utilized, in that it provides a compartment at the center of the locomotive frame which is of sufficient size to receive some of the storage batteries which are arranged in said intermediate compartment above the wheel axles. The electric motor D that propels the locomotive is arranged partly within said compartment. In fact, the construction above described makes it possible to equip the locomotive with storage batteries comprising a total, of, say, eighty-eight cells, and still keep the total height of the locomotive about thirty-two inches. The battery compartment at the front end of the locomotive is provided with a movable or removable cover 2 that completely protects the batteries arranged in said compartment, but still permits said batteries to be inspected or removed easily and the intermediate compartment, in which some of the batteries are housed, is also provided with a movable or removable cover 2ª, said covers being preferably formed from sheet metal plates that are connected by means of hinges 3 to the frame of the locomotive. The compartment at the rear end of the locomotive frame is of sufficient width to form a cock pit for the operator and also receive a controller box E and batteries $x$ that are protected by a cover 2ᵇ.

In order to reduce the width of the upwardly-projecting intermediate portion of the frame and thus enable the locomotive to travel through a low semi-circular tunnel or seam without liability of scraping against the roof or arch of the tunnel, I prefer to bevel or curve the upper outside edges of the intermediate portions of the side members C at 4, as indicated in Fig. 3, thus causing the intermediate portion of the frame, which is of the greatest depth, to conform substantially to the cross-sectional shape of tunnels of the character in which the locomotive is intended to be used. The ends of the upwardly-projecting intermediate portions of the side members C are also preferably beveled, as shown in Fig. 1, and transversely-disposed cover plates 5 are connected to said beveled ends so as to form closures for the intermediate compartment in which some of the batteries are arranged. The cover plate 5 at the rear end of the locomotive, namely, the one that extends transversely of the operator's cock pit, is used as an instrument board to carry some of the electrical instruments (not shown) with which the locomotive is equipped.

The end sills and side members of the frame preferably consist of castings, and the side members C are preferably provided with integral flanges 6 that support floor boards for the end compartments and for the portion of the intermediate compartment in which the intermediate batteries are arranged. The side members C can be formed in various ways without departing from the spirit of my invention, but in the locomotive herein shown each of the side members C comprises a vertically-disposed web a that extends unbrokenly from one end sill to the other and notched out at its center, as shown in Fig. 1, so as to receive the wheels A. A portion b that projects inwardly from the web a at the wheel opening in said web forms a guard for the wheels A and also serves as a bottom for the two sand boxes 1 that are arranged above the wheels. A vertically-disposed wall c that is connected to the inner edge of the portion b forms the inner wall of the wheel housing and the inner walls of the sand boxes 1. The beveled or curved portion 4, at the upper edge of the intermediate portion of the side member C, is formed by an integral portion of the web a that inclines inwardly toward the longitudinal center of the locomotive, said inwardly-inclined portion being integrally connected to a horizontally-disposed part d that forms the top walls of the sand boxes, said horizontally-disposed part d being integrally connected to the vertically-disposed portion c previously referred to. The hollow upper portion of the side member C that constitutes the sand boxes is provided with a vertically-disposed partition 7 that separates the sand boxes, and the outer ends of said sand boxes are formed by vertically disposed portions 8 that project inwardly from the web a and are connected at their lower ends to the portion b of the wheel housing.

From the foregoing it will be seen that the intermediate portion of each of the side members C is provided with a wheel housing open at its front side and having arranged above same a hollow portion that is divided by the partition 7 so as to form two sand boxes arranged directly over the wheels A. Each of the end portions of the side members C merely consists of a vertically-disposed web provided at its lower edge with an inwardly-projecting flange 6 that serves as a support for floor boards, said flange 6 being connected at its inner end to the adjacent end wall portion of the wheel housing and at its outer end to a vertically-disposed flange 9 on the member C through which bolts, rivets, or other suitable fastening devices 10 pass so as to secure the member C to the end sill against which it abuts.

A storage battery locomotive of the construction above described is compact and low enough to enable it to be successfully used in a coal mine for hauling coal cars through a low tunnel or seam. In fact, the locomotive that I am now manufacturing is only thirty-two inches in height, notwithstanding the fact that it is equipped with a 7½ horse power electric motor, and storage batteries of sufficient capacity to enable the locomotive to be used a full working day without recharging the batteries. All of the storage batteries of the locomotive are accessible but said batteries are so arranged that there is no liability of their being injured when the locomotive is in use by coming in contact with overhead obstructions in the tunnel through which the locomotive is traveling, or by objects dropping down on the batteries. In addition to the desirable features above pointed out, my improved locomotive is exceptionally strong and rigid and it is of such design that very little machine work is required in fitting the parts of same together, thus enabling it to be manufactured at a low cost.

Having thus described my invention, what I claim, and desire to secure by Letters Patent, is:

1. A storage battery locomotive having a frame comprising side members provided intermediate their ends with wheel housings, and hollow portions in said side members arranged above said wheel housings so as to serve as sand boxes.

2. A storage battery locomotive having a frame comprising side members provided intermediate their ends with upwardly-projecting portions that form the end walls of an intermediate compartment, and storage batteries arranged in said compartment.

3. A storage battery locomotive having a frame comprising side members provided intermediate their ends with upwardly-projecting portions that form the end walls of an intermediate compartment, and storage batteries arranged in said compartment, said upwardly-projecting portions being provided with sand boxes.

4. A storage battery locomotive, comprising a frame provided with side members, wheels, housings for said wheels formed in the intermediate portions of said side members, compartments at the ends of the frame which are of substantially the full width of the frame, and storage batteries in one of said compartments.

5. A storage battery locomotive having a frame comprising side members provided intermediate their ends with upwardly-projecting portions, and storage batteries housed in the space between the end portions of said side members and between the upwardly-projecting intermediate portions of said side members.

6. A storage battery locomotive having a frame comprising side members that are provided intermediate their ends with wheel housings, wheels arranged in said housings, a cock pit or operator's compartment in one end of said frame, a battery compartment in the opposite end of said frame, and a compartment between the wheel housings of said side members in which an electric motor and storage batteries are arranged.

7. A storage battery locomotive, comprising a frame mounted on wheels, batteries housed within said frame intermediate the top and bottom edges of the frame, and sand boxes formed in the side members of said frame directly above the wheels.

8. A storage battery locomotive, comprising a frame having side members provided intermediate their ends with upwardly-projecting hollow portions that serve as sand boxes, the upper side edges of said portions being beveled, curved or inclined transversely for the purpose described.

9. In a storage battery locomotive frame, a side member consisting of a casting provided with a vertically-disposed web that extends the entire length of said member and whose lower edge is notched or cut away intermediate its ends so as to form a wheel space, a wheel housing integrally connected to said web, and a hollow space in said casting above said wheel housing that is adapted to receive sand.

10. A storage battery locomotive, comprising a frame mounted on wheels and provided at its rear end with a cock pit for the operator, said frame having cast metal side members which are of sufficient depth in proximity to the wheels to permit sand receptacles to be formed in said members above the wheels, cover plates for the intermediate portion and front end portion of said frame, and a transversely-disposed instrument board arranged in proximity to the operator's cock pit and connected to the side members of the frame.

11. A storage battery locomotive having a rectangular-shaped frame composed of two end sills and two side members connected together by fastening devices, each of said side members having relatively shallow end portions and an intermediate portion of greater depth and width than said end portions and equipped with a wheel housing and a sand receptacle arranged above the wheel housing.

RAYMOND MANCHA.